(12) United States Patent
Wieczorek et al.

(10) Patent No.: US 7,549,708 B2
(45) Date of Patent: Jun. 23, 2009

(54) T-MEMBER FOR USE IN AN ARMREST OR INTERIOR COMPONENT OF A VEHICLE

(75) Inventors: Joseph P. Wieczorek, Lake Orion, MI (US); William B. Berghoff, Brighton, MI (US); Bryan W. Busha, Grand Blanc, MI (US); Daniel Muller, Harrison Township, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 93 days.

(21) Appl. No.: 11/580,199

(22) Filed: Oct. 12, 2006

(65) Prior Publication Data

US 2008/0111409 A1    May 15, 2008

(51) Int. Cl.
*A47C 7/02* (2006.01)

(52) U.S. Cl. .............. 297/452.6; 297/452.58; 297/227; 297/218.4; 297/218.5; 297/226

(58) Field of Classification Search .......... 297/452.6, 297/452.58, 452.59, 452.62, 218.4, 218.5, 297/226, 227
See application file for complete search history.

(56) References Cited

U.S. PATENT DOCUMENTS

| | | | |
|---|---|---|---|
| 2,808,101 A * | 10/1957 | McCormick | 5/405 |
| 4,664,961 A | 5/1987 | Vees et al. | |
| 4,711,190 A | 12/1987 | Smith | |
| 5,098,270 A | 3/1992 | Rohn | |
| 5,324,462 A | 6/1994 | Rohn | |
| 5,382,398 A | 1/1995 | Draxlmaier, Jr. | |
| 5,492,073 A | 2/1996 | Abraham | |
| 5,511,821 A | 4/1996 | Meyer et al. | |
| 5,733,001 A * | 3/1998 | Roberts | 297/218.1 |
| 5,762,363 A | 6/1998 | Brown et al. | |
| 5,788,272 A | 8/1998 | Yanase | |
| 5,816,610 A | 10/1998 | Higashiura et al. | |
| 5,816,660 A | 10/1998 | Johnson, III | |
| 5,826,938 A | 10/1998 | Yanase et al. | |
| 5,829,779 A | 11/1998 | Nakashima et al. | |
| 5,829,827 A | 11/1998 | Schaper et al. | |
| 5,845,966 A | 12/1998 | Severinski et al. | |
| 5,964,017 A * | 10/1999 | Roberts | 29/91.1 |
| 6,206,467 B1 * | 3/2001 | Mense et al. | 297/218.2 |
| 6,935,260 B2 | 8/2005 | Kromm et al. | |
| 2002/0130537 A1 | 9/2002 | Lotspih | |
| 2004/0227335 A1 | 11/2004 | Acker et al. | |

(Continued)

*Primary Examiner*—Laurie K Cranmer
(74) *Attorney, Agent, or Firm*—Raggio & Dinnin, P.C.

(57) ABSTRACT

A seam for use in a vehicle armrest or other interior component. The seam includes a first material and a second material joined to the first material. The seam also includes a T-member connected to the first material and the second material to form a French seam appearance on the outer surface of the material. The T-member is then used to align with a groove in a foam of an armrest or other interior component to create an exterior seam on an armrest or interior component of a vehicle. The seam is created using a guide member attached to a sewing machine that will allow for sewing of the first material and second material to the T-member in a simultaneous process at a predetermined speed thus increasing efficiency of manufacturing the upholstery panel and reducing costs to the manufacturer.

12 Claims, 2 Drawing Sheets

U.S. PATENT DOCUMENTS

2005/0156412 A1 7/2005 Panagos et al.
2005/0258624 A1 11/2005 Abraham et al.
2006/0061192 A1* 3/2006 Flegal et al. ............. 297/452.6

* cited by examiner

T-MEMBER FOR USE IN AN ARMREST OR INTERIOR COMPONENT OF A VEHICLE

BACKGROUND OF THE INVENTION

1. Field of the Invention

The subject invention generally relates to upholstery seams, and more particularly relates to an upholstery seam using a T-member for use in an automotive armrest, seat or interior component wherein at least two pieces of material are joined into a French seam.

2. Description of Related Art

Automotive engineers and designers have long sought to create vehicles having aesthetically pleasing exterior and interior designs. Exterior designs have become increasingly uniform over the years. Hence, the importance of uniqueness and aesthetic appeal in the automotive interior has grown. Attractive upholstered coverings such as interior trim, seats, armrests and steering wheels are the hallmark of the modern, high quality automobile. Ever higher customer quality demands continue to raise the bar for commercial acceptability and aesthetic appeal has become paramount in the sale of high profit margin vehicles. Accordingly, attention has turned to a less traditional element of interior design.

One example of such new focus involves the appearance of seams in upholstered interior components, such as seats, armrests, headrests, instrument panel pads and the like. Many leather and vinyl top layers of automotive interior parts have simulated exterior stitching that is molded integrally therein. This kind of simulated stitching can only have limited visual similarity to functional stitching, since it necessarily has the same color and appearances as the vinyl top layer which is integrally molded. Many current prior art interior surfaces now have a decorative stitching provided by real thread which require visual loops that lay flat on and tensioned against the top layer of the trim part for a desirable appearance and so as not to be pulled out of the trim part during ordinary use of the vehicle. The thread of these prior art seams which form the stitching have relatively thin, tough and incompressible characteristics so as to both properly visually simulate functional stitching and to stand up to wear on the surface of the trim part.

One type of prior art seam that is used on many automotive vehicle interior components, including seats and other interior components, is a French seam that presents a clean appearance for a joint which joins two pieces of material of a seat or interior component together at a secured seam. Many of these prior art French seams are made by applying a foam material to the backside of the leather, vinyl or other types of upholstery by laminating the foam to the back of the upholstery to ensure that the foam is secured to the material. Then one portion of the first material is sewn to a portion of the second material. Next edges are flipped over each other and a seam is placed at a predetermined distance from the joint seam to create a French seam look. The French seam gets the appearance from the foam being compressed on itself creating a hump like appearance adjacent to the seam, thus creating the French seam look that is desired by many automobile manufacturers.

However, the use of the French seam which is aesthetically pleasing to automobile manufacturers generally is not used on armrests and other smaller surfaces due to alignment issues and the appearance of the seams with respect to the armrest that it is being used on. Many of these prior art seams encounter visual difficulties such as an uniform surface and properly aligned seams when connecting the fabric to the armrest frame and over the underlying foam material. Therefore, many manufacturers will completely bypass any seams on the material covering armrests or other small portions of the vehicle interior components. Using one piece will avoid the use of any seams thus reducing the appealability of the interior to the automotive users.

Therefore, there is a need in the art for a French seam that can connect two materials and be used on an armrest or other interior component. There also is a need in the art for creation of a French seam that can be applied to any curved surface and any hard surface including hard plastic underlayments or hard foam underlayments thus creating a more aesthetically pleasing seam and a seam that is linearly accurate thus creating a more visually pleasing interior environment for the automotive user. There also is a need in the art for a way to produce a French seam for an armrest or like interior component that increases productivity and decreases the cost of manufacturing the materials for such interior components. Furthermore, there is a need in the art for a way to create a French seam that is less complicated and time consuming than those of prior art methodologies that use laminated foam materials or the like to create such a French seam. There also is a need in the art for a methodology of creating a French seam that will create uniform humps along the entire French seam and create a more desirable appearance for the French seam that is easier to use and apply to armrests and other small interior components of a vehicle. Hence, there is a need in the art for an improved French seam that reduces costs, is stronger, creates a cleaner and more aesthetically pleasing seam and it is easier to manufacture into automotive interior materials.

SUMMARY OF THE INVENTION

One object of the present invention is to provide an improved seam for use in an automotive interior component.

Another object of the present invention may be to provide a seam for use in a vehicle armrest that allows for quicker and more precise installation of material over an armrest.

Still another object of the present invention may be to provide a seam in an armrest that uses a T-member to align the seam at a predetermined position on the armrest.

Still another object of the present invention may be to provide a guide member for use on a sewing machine to allow for connection of two pieces of material to a T-member.

Another object of the present invention may be to provide a method of creating a French seam with a T-member that is more economical to produce and more robust in the operating environment.

Still another object of the present invention may be to provide a way to align a seam according to the present invention on an armrest or other interior component of the vehicle.

To achieve the foregoing objects, the seam for connecting at least two pieces of material together for use on an armrest or other vehicle interior component is disclosed. The seam generally includes a first material and a second material connected to the first material. The seam further includes a T-member, which is made by an extrusion process, secured to the first material and second material to form a French seam that is aesthetically pleasing on the exterior surface of the armrest or vehicle interior component.

One advantage of the present invention may be that it provides a novel and improved seam for use on an armrest or other interior component of a vehicle.

Still a further advantage of the present invention may be that it allows for the use of a French seam on an automotive armrest or other interior component.

Still another advantage of the present invention may be that it provides a way of creating a seam that connects two pieces of material to a T-member, wherein that T-member can be aligned in a precise location on an interior component.

Yet a further advantage of the present invention may be that the seam will create a more aesthetically pleasing interior appearance for an armrest and the like inside the vehicle.

Still another advantage of the present invention may be that it creates an improved manufacturing methodology for creating a French seam for use on armrests and other interior components of a vehicle.

Still another advantage of the present invention may be the use of a guide member for creating the French seam by connecting at least a first and second material to an extruded T-member thus creating a portable French seam for use in applying over armrests and the like within a vehicle.

Still another advantage of the present invention may be to use an extrudable material to make the T-member which will allow for an increase in manufacturing efficiencies and reduce costs in making a French seam for use on a vehicle interior component such as armrests and the like.

Other objects, features and advantages of the present invention will become apparent from the subsequent description and the appended claims, taken in conjunction with the accompanying drawings.

DESCRIPTION OF THE EMBODIMENT(S)

Figure 1:
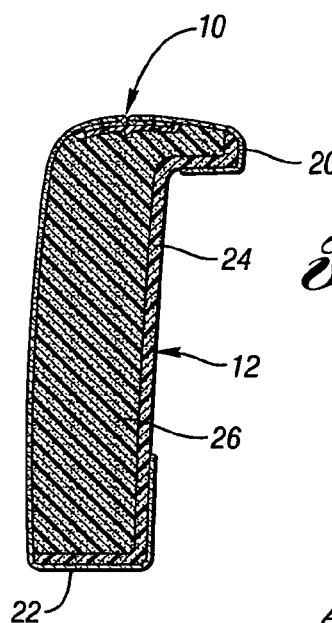
FIG. 1 shows an armrest having a seam with a T-member according to the present invention.

Referring to the drawings, a seam 10 for use in a vehicle on an armrest or other interior component 12 and a guide member 14 for making the seam 10 is disclosed. It should be noted that the upholstered seam 10 shown in the drawings may be for use on any interior component of an automotive vehicle. The figures show one use of such a seam 10 having a T-member 16 for use on a vehicle armrest 12. The seam 10 may be used with any type of material such as laminate back material, non-laminate back material, stock material, or any known covering material or fabric that may be or has been used to cover any vehicle interior components such as a seat, armrest, dashboard, etc., including but not limited to leather, cloth, vinyl, imitation leathers, or any other known material used on vehicle interior components. The use of the seam 10 according to the present invention will allow for quicker and easier installation of material or fabric over interior components such as an armrest 12. The seam 10 may include a mechanism to insure proper alignment of the seam with respect to any linear or nonlinear line on the armrest 12 or the like. The seam 10 will be made using any known sewing machine and guide member 14 as described herein. This will allow for increased efficiencies in the manufacturing process by creating a French seam or other seam in less time with more efficient implementation. It should be noted that any other type of seam other than a French seam may also be used and made by the present invention. However, the seam 10 shown in the drawings is that of a French seam. It should further be noted that any type of thread may be used for any of the connection or stitch lines in the seam 10 according to the present invention. Such threads may be plastic materials, composite materials, natural materials, cotton materials, polyester materials, or any other type of material used to make any known thread or contemplated threads.

Figure 2:
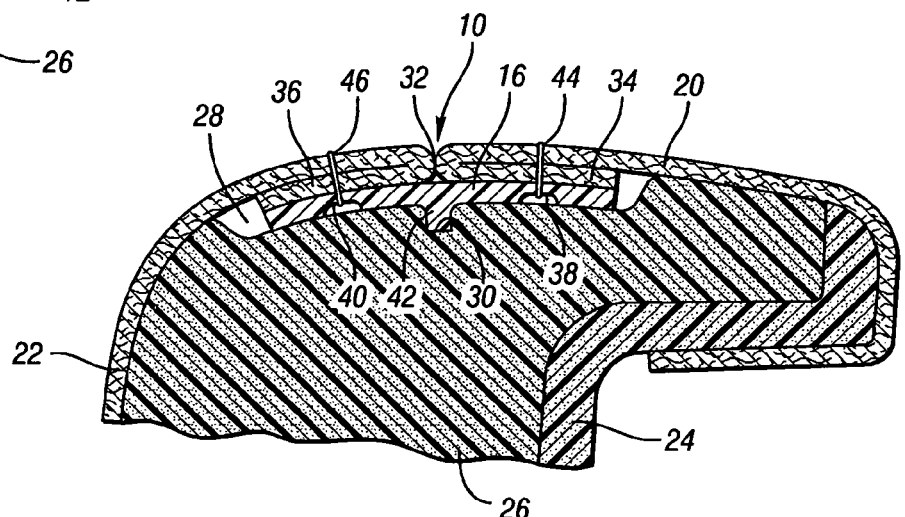
FIG. 2 shows a close up of a seam having a T-member for use on an armrest in an automotive vehicle according to the present invention.

As shown in FIGS. 1 and 2, an armrest 12 for use in a vehicle includes a first 20 and second upholstery panel, material, or fabric 22 connected at a seam 10 for use in covering the external surfaces of the armrest 12. The armrest 12 generally includes a frame 24 having a predetermined shape. The frame 24 may be made of any known plastic, composite, metal, natural material or any other known material. Arranged within predetermined portions of the frame 24 of the armrest 12 is a foam material 26. However, it should be noted that any other type of material that includes a density similar to or different from the foam material 26 chosen may also be used. The foam material 26 generally will include a highly compressible material that will provide for a cushioning effect for a vehicle user's arm with enough support to create a clean uniform appearance on the outer surface during and after use of the armrest by the user's arm. Furthermore, the foam material 26 will allow for proper safety crash requirements with regard to vehicle occupants exposure and collisions with the armrest 12 during a vehicle crash incident. It should be noted that any other type of plastic, rubber, composite, natural material or the like may be used in place of the foam 26, which generally has the characteristics of high density and highly compressible foam according to the present invention. The foam 26 will include a trench 28 arranged on one surface thereof. Apparently along a mid point of the trench 28 may be a groove 30 formed into the foam 26 that extends a predetermined distance along the length of the armrest or other interior component 12. The first and second material 20, 22 are wrapped around at least a portion of the frame 24 of the armrest 12 and a portion of the foam material 26. The first and second materials 20, 22 are then connected on one end thereof to the frame 24 via any known fastener. It should be noted that the fastener may be of any mechanical type or chemical type including but not limited to staples, nails, tacks, glue, or other composite connecting and chemically activated materials.

The first and second materials 20, 22 are connected to one another at the seam 10 according to the present invention. As noted above, the seam 10 according to the present invention generally has a French seam appearance. The seam 10 will have the first 20 and second material 22 joined along a stitching line that is a longitudinal joint or connection sew line 32. It should be noted that all of the stitching lines described herein including this one, is made with any known type of thread. The joint sew line 32 is positioned inboard of the longitudinal edges of the panels 20, 22 respectively. As used herein the term "inboard" should be understood to mean a direction essentially away from longitudinal edges, whereas the term "outboard" refers to the opposite direction toward the edges. Therefore, the joint sew line 32 runs the entire length of the first and second panels 20, 22 along the longitudinal edge. This will leave a predetermined flap edge 34, 36 for both the first and second materials 20, 22 that will be capable of being folded over to create a French seam appearance for the upholstered panel.

A T-member 16 is attached to the first and second panels 20, 22 via a stitch line through each panel. The T-member 16 generally has a T-shaped cross section with a first groove 38 and a second groove 40 arranged at predetermined positions. The grooves 38, 40 may also be parallel to one another. The grooves 38, 40 generally extend the entire length of the T-member 16. The T-member 16 also has arranged generally at a center point thereof an extension member 42 which extends a predetermined distance from a bottom surface of the T-member 16. It should be noted that the T-member 16 is generally made by an extrusion process with any known extrudable plastic material. However, it should also be noted that the T-member 16 may be made with any other type of molding technique, injection molding technique, or other methodologies for making plastic into a predetermined shape as described above. In the embodiment shown the T-member 16 is made through an extrusion process using any known plastic material. However, it should be noted that any other type of metal, ceramic, metal composite or natural material may also be used for the T-member 16. The extension 42 will be used to interact with the groove 30 located in the trench 28 of the foam 26. The first and second groove 38, 40 located on a bottom surface of the T-member 16 generally has a semi circular or semi oval shape, however any other shaped groove may be used for the T-member 16. It should be noted that the first and second grooves 38, 40 of the T-member 16 have a predetermined depth into the T-member 16 and that depth can be of any known dimension depending on the design requirements of the T-member 16. Furthermore, the extension 42 of the T-member 16 may extend any known distance from the T-member 16 depending on the design requirements of the T-member 16.

The T-member 16 is connected to the first material 20 and the second material 22 of the upholstery panel. As shown in FIGS. 1 and 2 the first material 20 is folded over itself such that the flap 34, defined in part by the joint connection sew line 32, contacts a surface of the T-member 16 and then the remaining portion of the first material 20 is folded there over and a first stitch line 44 is placed through the folded over portion of the first material 20, the flap 34 of the first material 20 and the T-member 16 such that the first stitch line 44 passes through or near the first groove 38 of the T-member 16. This stitch 46 will attach the first material 20 to the T-member 16 on one end thereof. The second material 22 will then have its flap 36 engaged with an opposite portion of the T-member 16 and the remaining portion of the second material 22 folded there over. Then a second stitch line 46 will be placed through the second material 22, the flap 36 and the T-member 16 such that the stitch 44 passes through or near the second groove 40 of the T-member 16. This will create a French seam 10 appearance along the entire longitudinal edge of the first and second material 20, 22 along the entire edge of the armrest 12 of the vehicle. With the first and second material 20, 22 thus connected to the T-member 16, the T-member 16 can be aligned and engaged with the groove 30 located in the trench 28 of the foam 26 of the armrest 12 by placing the extension 42 extending from the bottom portion of the T-member 16 into the groove 30 thus holding the T-member 16 in a fixed manner with respect to the foam 26 and the frame 24 of the vehicle armrest 12. This will ensure that the French seam 10 is arranged along a predetermined linear path and/or nonlinear path of the armrest 12 thus creating a more aesthetically pleasing and uniform surface for the material covering the armrest 12 thus increasing the visual appearance and beauty of the vehicle interior.

After the T-member 16 is arranged within the groove 30 of the trench 28 within the foam 26, the opposite or face ends of the first material 20 and second material 22 will be folded over and around and connected to the frame 24 of the armrest 12 via any known fastening methodology. This will create a complete covering for the armrest 12 that has a seam 10 which creates a more visually appealing interior for automotive vehicle interiors thus increasing the craftsmanship and overall value of the automotive vehicle. This creates a more pleasing appearance than that of the prior art where one piece of material may be used to cover the entire armrest with no seams showing thus reducing the desirability of such armrests and the value of the automotive vehicle in the consumers eyes. It should be noted that it is also contemplated to have various thickness T-members 16 such that the trench and the foam of the armrest or other interior component does not have to be too deep. However, in the embodiment shown the trench 28 in the foam 26 generally will create a smooth outer surface to the user of the exterior upholstery panel, thus creating a more eloquent and aesthetically pleasing interior component for the automotive manufacturers. It should be noted that the French seam 10 may also include a cord or filament arranged within the first material and second material to create a more defined hump for the French seam if so desired as disclosed in Applicant's prior invention filed as a U.S. patent application Ser. No. 11/494,329.

Figure 3:
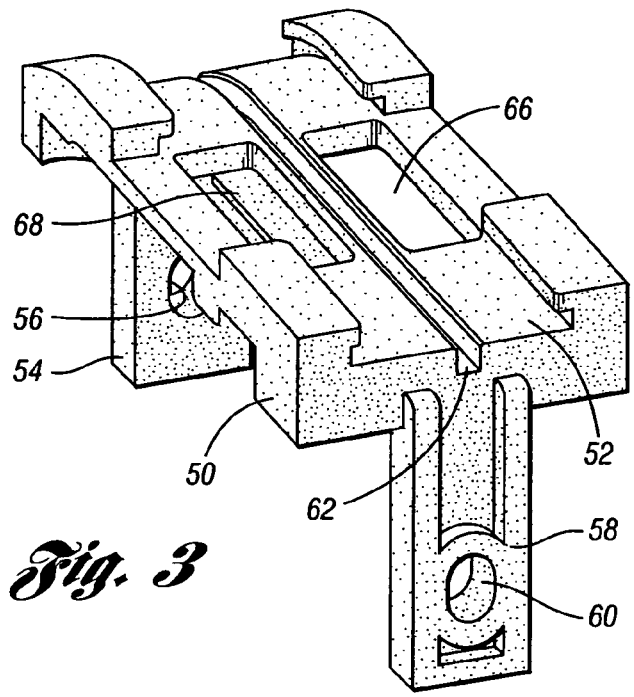
FIG. 3 shows an end view of a guide member according to the present invention.
Figure 4:
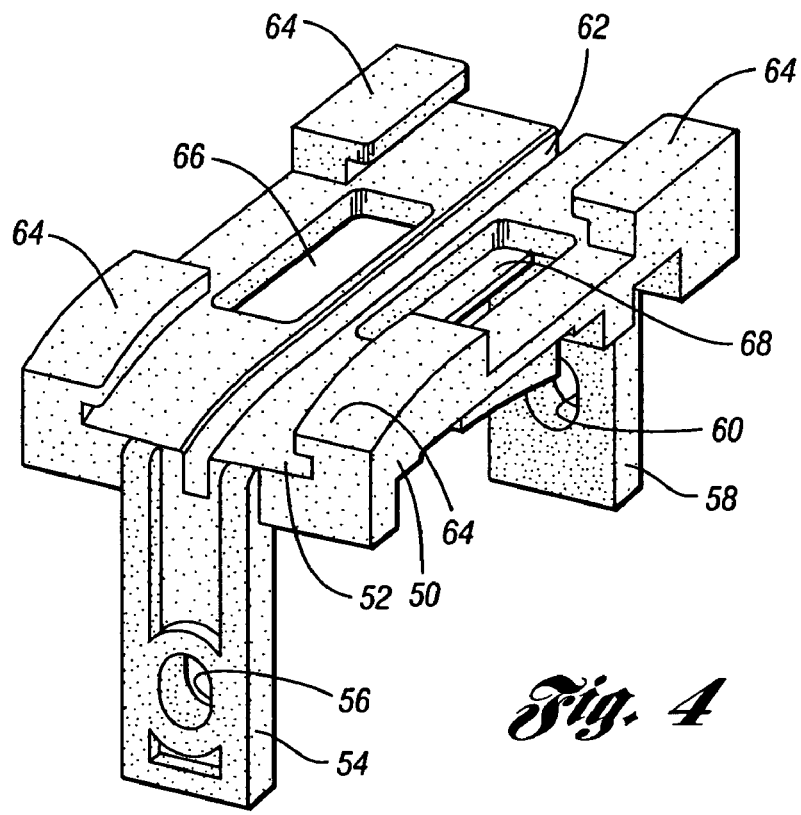
FIG. 4 shows an end view of a guide member according to the present invention.
Figure 5:
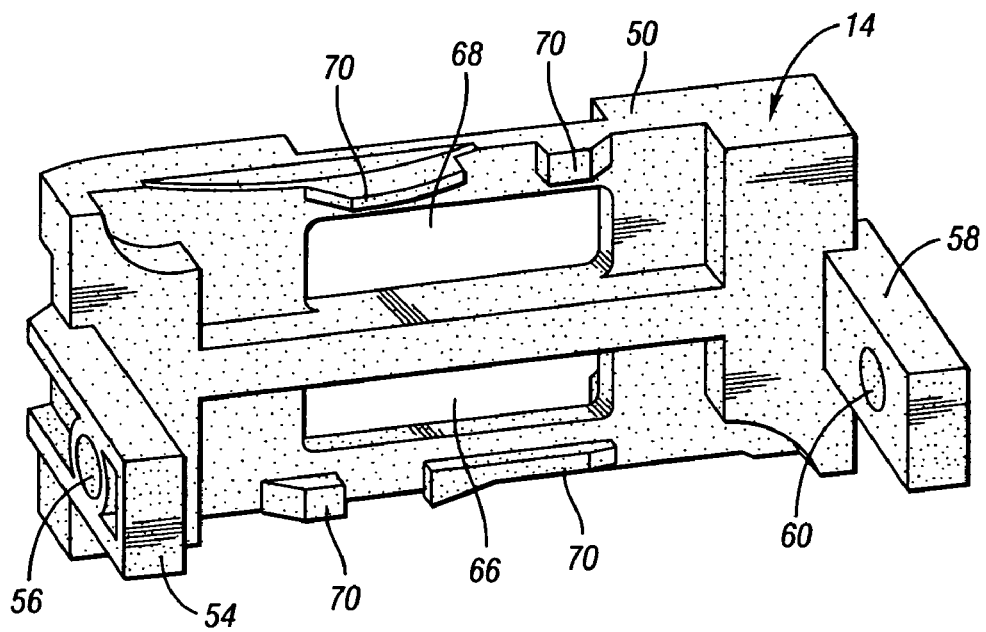
FIG. 5 shows a bottom view of a guide member according to the present invention.

In operation, generally the first and second piece of material 20, 22 are connected to the T-member 16 before being placed over the foam 26 and frame 24 of the armrest 12. The connection of the first and second material 20, 22 to the T-member 16 generally is accomplished by using any known sewing machine that includes a guide member 14 as disclosed in FIGS. 3 through 5. The guide member 14 can be used with any known sewing machine that includes any known threading mechanism and Bobbitt system and any known needle system to create the French seam 10 as shown in FIGS. 1 and 2. Generally, the guide member 14 is connected to an arm portion of a sewing machine via any known fastener. The guide member 14 includes a body 50 having a track 52 arranged on one surface thereof. A first flange 54 extends from one end of the guide member 14. The first flange 54 generally has a rectangular shape, however any other shape may be used. The first flange 54 includes an orifice 56 at a predetermined position through a surface thereof. A second flange 58 extends from the opposite end of the guide member body 50 and generally has a rectangular shape, however any other shape may also be used. The second flange 58 also includes an orifice 60 at a predetermined position through a surface thereof. In the embodiment shown the orifices 56, 60 through the first and second flange 54, 58 generally have an oval shape, however any other shape may be used for the orifices 56, 60 therethrough. The flanges 54, 58 extending from both ends of the body 50 of the guide member 14 generally are used to connect the guide member 14 to the arm portion of the sewing machine directly adjacent to and below the needles or needle portion of the sewing machine. Any known fastener can be placed through the orifice 56, 60 and into the sewing machine arm to connect the guide member 14 to the sewing machine.

Arranged on the top surface of the body 50 as described above is a track 52. The track 52 generally includes a groove 62 in a surface along a center line thereof. The groove 62 generally has a depth that will mimic or be approximately the same as the extension 42 of the T-member 16 being passed through the guide member 14. The track 52 also will include a plurality of inward extending flanges 64 that create a partially enclosed track for the T-member 16 to ride or pass along. In the embodiment shown there are four inwardly extending flanges 64, one arranged at or near each corner of the body 50. The inward extending flanges 64 partially extend a predetermined distance along the length of the body 50 of the guide member 14. The inward extending flanges 64 will generally create a partial T-shape cross sectional view of the track 52 when viewed from an end of the guide member 14. The T-member 16 will be placed in the track 52 and ran or passed through the guide member 14 at a predetermined speed so attachment of the first and second material 20, 22 to the T-member 16 can occur. The guide member 14 also includes a first and second orifice 66, 68 arranged along the groove 62, one on each side thereof. In the embodiment shown the orifices 66, 68 generally are rectangular in shape, however any other shaped orifice may be used in the surface of the body 50. The orifices 66, 68 will allow for the needles of the sewing machine to pass through the first and second material 20, 22 and the T-member 16 thus creating the proper stitch lines for the French seam 10. It should be noted that it is contemplated to have just one orifice through the body 50 of the guide member 14 depending on the stitch line needed and the design required for the seam for connecting the material to the T-member 16. The bottom portion of the guide member 14 will include a plurality of bosses or extension members 70 that will help in guiding the thread to the proper position to create the proper stitch between the first and second material 20, 22 and the T-members 16. The guide member 14 has a curved surface on one end of the track 52, and a flat surface on the opposite end of the track 52. In operation, the T-member 16 will be fed in on the curved surface side of the track 52 and exit on the flat side of the guide member 14 after being attached to the first and second fabric or material 20, 22. It should be noted that the guide member 14 may be made of any type of plastic, ceramic, composite, natural material, or metal depending on the design requirements and environment in which the guide member 14 will be used in the sewing machine. In the embodiment shown it is generally made out of a hard plastic material.

In operation the making of the seam 10 according to the present invention will involve the operator of a sewing machine attaching the guide member 14 to the appropriate position on the arm of the sewing machine. The attachment is done with any known fastener or fastening technique. Next the operator of the sewing machine will take a spool of T-member 16 and feed it into the curved surface entry way of the guide member 14. Next a connection stitch line 32 will be made between a first material 20 and second material 22 which will be used to create the seam 10. The joint connection sew line 32 may be performed on the same sewing machine as that using the guide member 14 or it may be conducted on a separate machine and then the two pieces of material 20, 22 with the joint connection sewn line 32 therein is brought to the sewing machine having the guide member 14. The first and second material 20, 22 will then be placed within the guide member 14 such that the flap 34, 36 of the first and second material 20, 26 will be in contact with a top surface of the T-member 16. This is accomplished by having the operator of the sewing machine align the end of the flap 36 of the first material 20 with one end of the T-member 16 and the end of the flap 36 of the second material 22 with the opposite end of the T-member 16. The T-member 16 is then placed onto the curved surface of the track 52 of the guide member 14 such that the flap 34, 36 of the first material 20 and second material 22 engages with a top surface of the guide track 52 and the T-member 16 engages with a bottom portion of the guide track 52. The combination of the T-member 16 and first and second material 20, 22 is then fed through the guide member 14 at a predetermined speed, after the first and second materials 20, 22 face ends are folded over such that the joint connection seam 32 is generally aligned with the mid point of the T-member 16 which generally is where the extension 42 extends from the bottom surface of the T-member 16. The appropriate stitch line 44, 46 is placed into the first material 20 and second material 22 simultaneously by the sewing machine, such that the first stitch line 44 and second stitch line 46 pass through the first and second groove 38, 40 respectively of the T-member 16. This will create the French seam 10 for the first and second material 20, 22 with both materials connected to the T-member 16 after passing through the guide member 14 of the sewing machine. After the T-member 16 is sewn along the entire longitudinal length of the first and second material 20, 22, the French seam 10 will be complete. Then the operator of the sewing machine will take the first and second material 20, 22 which is now one exterior or upholstery panel for a vehicle armrest or other interior component and place the automotive upholstery panel onto the armrest 12 such that the extension 42 of the T-member 16 will be placed in and aligned along the groove 30 of the foam 26 in the armrest 12. Then the free ends of the first material 20 and second material 22 will be folded over the remainder of the exposed foam material 26 and at least a portion of the armrest frame 24 and be connected to the armrest frame 24 via any known fastener or connecting methodology. This will create an armrest 12 having two pieces of material and a French seam 10 arranged along a predetermined portion of the armrest thus creating a more pleasing visual exterior upholstery panel and increasing the value of the automotive vehicle and the status of the automotive vehicle in the consumer market.

It should be noted that any known manual or automatic methodology of moving the T-member 16 and the first and second material 20, 22 through the sewing machine and guide member 14 may be used depending on the design requirement and manufacturing methodologies of the present invention. Complete automation of the process is possible including placement of the upholstery with the T-member 16 onto the vehicle armrest or interior component. It should further be noted that any type of material may be used for the threads and/or upholstery material for use on the armrest.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A seam for connecting material together for use on an armrest in a vehicle, said seam comprising:
   a first material;
   a second material connected by a joint sew line to said first material;
   a T-member secured to said first material and said second material;
   a stitch line through said first material and said T-member; and
   a second stitch line through said second material and said T-member.

2. The seam of claim 1 wherein said T-member is an extrusion.

3. The seam of claim 1 wherein said T-member having a groove in a surface thereof.

4. The seam of claim 1 wherein the seam is a French seam.

5. The seam of claim 1 wherein said T-member is made of a plastic material.

6. An armrest for use in a vehicle, said armrest comprising:
   a frame;
   a foam arranged within predetermined portions of said frame;
   a first and second fabric arranged over said frame and said foam;

a T-member arranged between said fabrics and a portion of said foam, said T-member having a groove in a surface thereof, said T-member having a second groove in a surface thereof;

a first stitch line passing through said first fabric and said groove; and a second stitch line passing through said second fabric and said second groove.

7. The armrest of claim 6 wherein said foam having a groove therein.

8. The armrest of claim 7 wherein said T-member arranged within said groove.

9. The armrest of claim 6 wherein said second groove is parallel to said groove.

10. The armrest of claim 6 wherein said T-member is extruded from a plastic material.

11. The armrest of claim 6 wherein said first stitch line connects said first fabric to said T-member and said second stitch line connects said second fabric to said T-member.

12. The armrest of claim 11 wherein said stitch lines form a French seam.

* * * * *